US012170021B2

(12) United States Patent
Eguchi et al.

(10) Patent No.: US 12,170,021 B2
(45) Date of Patent: Dec. 17, 2024

(54) INFORMATION PROCESSING METHOD AND INFORMATION PROCESSING APPARATUS

(71) Applicant: HONDA MOTOR CO., LTD., Tokyo (JP)

(72) Inventors: Makoto Eguchi, Tokyo (JP); Mitsuki Kimura, Tokyo (JP); Shigeyuki Odashima, Tokyo (JP); Masato Kaneyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 402 days.

(21) Appl. No.: 17/574,137

(22) Filed: Jan. 12, 2022

(65) Prior Publication Data

US 2022/0262238 A1 Aug. 18, 2022

(30) Foreign Application Priority Data

Feb. 18, 2021 (JP) ................................ 2021-023892

(51) Int. Cl.
*G08G 1/01* (2006.01)
*G06Q 50/10* (2012.01)

(52) U.S. Cl.
CPC ........... *G08G 1/0112* (2013.01); *G06Q 50/10* (2013.01); *G08G 1/0133* (2013.01); *G08G 1/0145* (2013.01)

(58) Field of Classification Search
CPC .. G08G 1/0112; G08G 1/0133; G08G 1/0145; G08G 1/0104; G08G 1/0125; G06Q 50/10
See application file for complete search history.

(56) References Cited

U.S. PATENT DOCUMENTS

2007/0208492 A1* 9/2007 Downs ................. G08G 1/0104 701/117
2008/0071465 A1* 3/2008 Chapman ........... G01C 21/3691 701/117
2015/0088406 A1* 3/2015 Blandin ............... G08G 1/0125 701/117
2020/0025584 A1* 1/2020 Fowe ................. G01C 21/3492
2020/0073966 A1* 3/2020 Fowe .................... G06F 16/285
(Continued)

FOREIGN PATENT DOCUMENTS

JP 2016-110360 6/2016
JP 2016-173270 A 9/2016

OTHER PUBLICATIONS

Japanese Office Action dated Jun. 4, 2024 issued in corresponding Japanese application No. 2021-023892; English translation included (5 pages).

*Primary Examiner* — Frederick M Brushaber
(74) *Attorney, Agent, or Firm* — Rankin, Hill & Clark LLP

(57) ABSTRACT

Provided is an information processing method of determining the influence of the event on the traffic condition, and this method includes a first link setting step of setting a link, related to an occurrence position of the event, as a target link, a determining step of determining a degree of influence of the event on the traffic condition of the target link, and a second link setting step of setting a link adjacent to the target link as a new target link based on a determination result of the determining step, in which the processing in the determining step is performed on the target link specified in the second link setting step.

11 Claims, 8 Drawing Sheets

(56) References Cited

U.S. PATENT DOCUMENTS

| | | | | |
|---|---|---|---|---|
| 2020/0160695 | A1 | 5/2020 | Liu et al. | |
| 2020/0193823 | A1* | 6/2020 | Zhang ................ | G08G 1/09623 |
| 2021/0104155 | A1* | 4/2021 | Xu ........................ | B60W 50/14 |

* cited by examiner

FIG.2

54

| TYPE OF EVENT | TYPE OF FACILITY |
|---|---|
| CONFERENCE | STATION |
| EXHIBITION | STATION |
| SPORTS EVENT (BASEBALL) | PARKING LOT |
| ⋮ | ⋮ |

INFORMATION PROCESSING METHOD AND INFORMATION PROCESSING APPARATUS

INCORPORATION BY REFERENCE

The present application claims priority under 35 U.S.C. § 119 to Japanese Patent Application No. 2021-023892 filed on Feb. 18, 2021. The content of the application is incorporated herein by reference in its entirety.

BACKGROUND

Technical Field

The present invention relates to an information processing method and an information processing apparatus.

Related Art

In the prior art, a method of determining an influence of an event such as a sport event or a special event on a traffic condition has been proposed. For example, JP 2016-110360 A discloses a method of dividing a region into a plurality of areas in a lattice shape based on latitude and longitude, and performing congestion prediction using an average congestion degree on weekdays and an average congestion degree on holidays in a prediction target area. JP 2016-110360 A further discloses, as a method of selecting the prediction target area, taking an area having many residents as the prediction target area, taking an area having a POI as the prediction target area, selection based on a past congestion degree for each area, and other methods.

SUMMARY

However, in the processing of determining the traffic condition for each area obtained by dividing the region, it is necessary to determine the traffic condition on many roads included in the area, and there is a problem that efficiency is low.

The present invention has been made in view of such a background, and an object of the present invention is to provide a method capable of efficiently performing processing of determining an influence of an event on a traffic condition.

A first aspect for achieving the above object is an information processing method of determining an influence of an event on a traffic condition, the method including: a first link setting step of setting a link, related to an occurrence position of the event, as a target link; a determining step of determining a degree of influence of the event on the traffic condition of the target link; and a second link setting step of setting a link adjacent to the target link as a new target link based on a determination result of the determining step, in which the processing in the determining step is performed on the target link specified in the second link setting step.

In the information processing method, in the determining step, when it is determined that the degree of influence of the event on the traffic condition of the target link is low, the second link setting step may not be executed.

In the information processing method, in the determining step, the degree of influence of the event on the traffic condition of the target link may be determined for each moving direction in the target link.

In the information processing method, in the determining step, when the target link is a large-scale road, the degree of influence of the event on the traffic condition of the target link may be determined for each moving direction in the target link.

In the above information processing method, in the determining step, a first histogram indicating a distribution of a travel time for the target link in a first time zone and a second histogram indicating a distribution of the travel time for the target link in a second time zone farther from an occurrence time of the event with respect to the first time zone are created, and the degree of influence of the event on the traffic condition of the target link may be determined based on a difference between the distributions of the first histogram and the second histogram.

In the above information processing method, in the determining step, a distance index between the first histogram and the second histogram may be calculated, and the presence or absence of the degree of influence of the event on the traffic condition of the target link may be determined by comparing the distance index with a threshold.

In the above information processing method, in the determining step, the threshold may be corrected based on a difference in distribution spread between the first histogram and the second histogram, and the determination may be performed using the corrected threshold.

In the above information processing method, in the determining step, when the target link is a road allowing passage in a first direction and a second direction opposite to the first direction, the threshold in a case where the degree of influence of the event on the traffic condition of the target link in the first direction is determined may be corrected based on the traffic condition of the target link in the second direction.

In the above information processing method, in the determining step, when the target link is not a large-scale road, the threshold in the case where the degree of influence of the event on the traffic condition of the target link in the first direction is determined may be corrected based on the traffic condition of the target link in the second direction.

In the information processing method, in the first link setting step, among facilities associated with the occurrence position, a link close to the facility of the type associated with the type of the event may be set as the target link.

A second aspect for achieving the above object is an information processing apparatus that determines an influence of an event on a traffic condition, the information processing apparatus sets a link, related to an occurrence position of the event, as a target link, executes a determination processing of determining a degree of influence of the event on the traffic condition of the target link, sets a link adjacent to the target link as a new target link based on a result of the determination processing, and performs the determination processing on the target link specified.

According to the above configuration, a target of determination is expanded by setting a new target link based on the result of determining the degree of influence of an event on the traffic condition of the target link, so that processing of determining the influence of the event on the traffic condition can be efficiently performed.

BRIEF DESCRIPTION OF DRAWINGS

FIG. 2 is a schematic diagram illustrating a configuration example of start position setting data;

DETAILED DESCRIPTION

1. Configuration of Information Processing Apparatus

Figure 1:
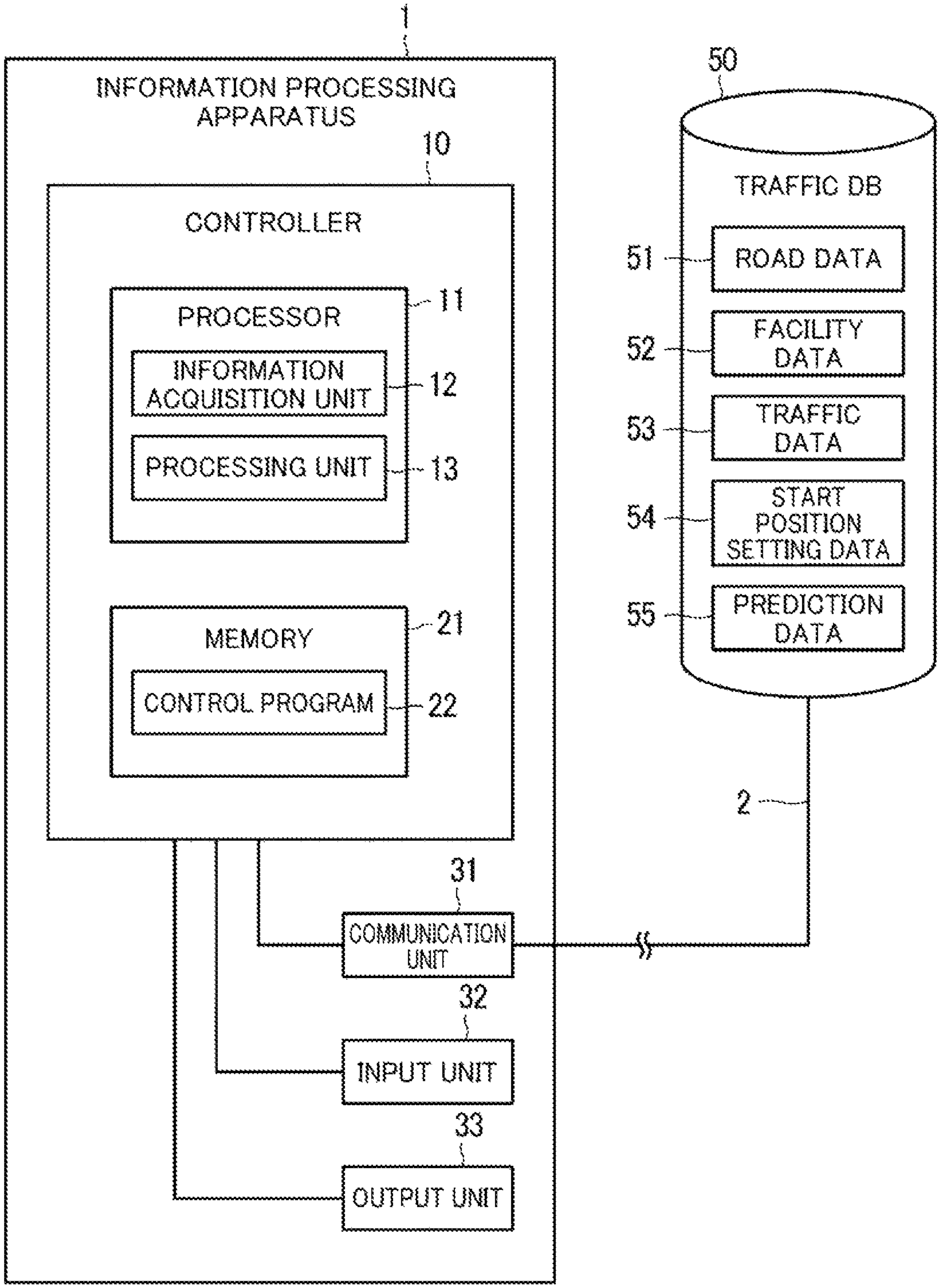
FIG. 1 is a schematic configuration diagram of an information processing apparatus.

FIG. 1 is a schematic configuration diagram of an information processing apparatus 1 according to an embodiment of the present invention. The information processing apparatus 1 is a computer that processes data regarding a traffic condition of a road. The information processing apparatus 1 is connected to a traffic database 50 via a communication network 2.

The information processing apparatus 1 of the present embodiment determines an influence on the traffic condition of a link for each link when an event is held, thereby generating prediction data 55 for predicting the influence of the event on the traffic condition.

In the following description, the event is a phenomenon including an exhibition, a sport event, an entertainment event, a commercial event, a political or non-political meeting, and other events held intentionally. The event may include unintentionally occurring intentional phenomena such as an accident, and unintentional phenomena such as natural phenomena including disasters. The event may include phenomena occurring due to the various phenomena described above.

The information processing apparatus 1 includes a controller 10, a communication unit 31 (transmitter/receiver), an input unit 32, and an output unit 33. The controller 10 includes a processor 11 and a memory 21. The processor 11 includes a central processing unit (CPU) and a microcontroller. The memory 21 stores programs and data executed by the processor 11. The memory 21 may be a nonvolatile storage device that stores programs and data in a nonvolatile manner. Furthermore, the memory 21 may be a volatile storage device that forms a work area of the processor 11.

The processor 11 includes an information acquisition unit 12 and a processing unit 13.

The information acquisition unit 12 controls the communication unit 31 to acquire data from the traffic database 50 via the communication network 2.

The processing unit 13 processes the data acquired by the information acquisition unit 12. The processing unit 13 transmits processing result data to the traffic database 50 by the communication unit 31.

The communication unit 31 is a communication interface device including a connector that connects the communication network 2, a transmission/reception circuit, an encoder, a decoder, and the like. The communication unit 31 executes data communication with the traffic database 50 under control of the controller 10.

The input unit 32 is an input interface, such as a connector or a wireless adaptor to connect an input device such as a keyboard, a mouse, or a track pad to the information processing apparatus 1. The input unit 32 receives an operation of an operator of the information processing apparatus 1 through the input device connected to the input unit 32. The input unit 32 acquires an operation signal input from the input device and outputs data indicating an operation content to the controller 10.

The output unit 33 is a connector or a wireless adaptor to connect an output device, for example, a display to the information processing apparatus 1. The output unit 33 outputs information under the control of the controller 10 and causes the display to display a video. Furthermore, the output unit 33 may be connected to a printer, and may cause the printer to execute printing.

The information processing apparatus 1 may be connected to a terminal device (not illustrated) by the communication unit 31 and operate by receiving remote access from the terminal device. Although FIG. 1 illustrates an example in which the information processing apparatus 1 is configured separately from the traffic database 50, the information processing apparatus 1 may be the same server device as the traffic database 50. The information processing apparatus 1 and the traffic database 50 may be configured by a computer or by a system in which a plurality of server devices (computers) perform distributed processing.

The traffic database 50 stores road data 51, facility data 52, traffic data 53, start position setting data 54, and prediction data 55.

The road data 51 is geographic data on roads, and includes information on nodes and links. For example, the road data 51 includes, for a node, a node number, a position coordinate, an elevation, a node type, the number of connected links, a connection node number, an intersection name, and the like. Furthermore, for example, the road data 51 includes, for a link, a link number, a road type, a route number, emphasized route information, a link length, a common use state, a width division, the number of lanes, a roadway width, a central zone width, a position coordinate of an interpolation point, an elevation of the interpolation point, expressway numbering, and the like. The link number may be a node number of a start point or an end point of the link. The road data 51 may also include, for the link, attributes such as bridges, elevated roads, tunnels, caves, crossings, pedestrian bridges, and underpasses.

The facility data 52 includes data such as a position and a name of a facility such as a local government building, a service area, a parking area, a roadside station, a ferryboat terminal, a railway station, or an airport.

The traffic data 53 includes data regarding the traffic condition of the link included in the road data 51. Specifically, a traffic volume and a link travel time are included. The traffic data 53 includes the traffic volume and the link travel time in association with the link, a traveling direction in the link, and a date and time division including a date and a time zone. The traffic data 53 includes a plurality of data corresponding to one link, the traveling direction, and the date and time division. The traffic data 53 may be configured by data regarding passage of vehicles, and may include data of a plurality of types of moving bodies. For example, the traffic data 53 may include a vehicle traffic volume and the link travel time, and a pedestrian traffic volume and the link travel time. The travel time refers to a time required for a vehicle to pass through the link.

The traffic data 53 is data obtained by observing and totalizing the traffic condition of the link included in the road data 51. The traffic data 53 includes, for example, a date and time when an event occurred in the past, a time zone when the event is held, and data observed in other time zones. For example, for the link included in the road data 51, past data observed by a system that observes the traffic condition at regular time intervals is included in the traffic data 53.

The start position setting data 54 is data that designates the type of facility to be an initial position of determination in processing of determining the influence of the event on the traffic condition of the link.

FIG. 2 is a schematic diagram illustrating a configuration example of the start position setting data 54.

As illustrated in FIG. 2, the start position setting data 54 associates the type of the facility to be the initial position of the determination with the type of the event. For example, when the type of the event is a conference and an exhibition, a station is associated with the facility to be the initial position of the determination, that is, a start position. The conference includes, for example, an academic conference and other conferences. For example, when the type of the event is a sports event such as baseball, a parking lot is associated as the facility to be the start position.

The traffic database 50 may have the start position setting data 54 for each region. Furthermore, for example, the traffic database 50 may have the start position setting data 54 applied to an urban area and the start position setting data 54 applied to a suburb.

2. Operation of Information Processing Apparatus

Figure 3:
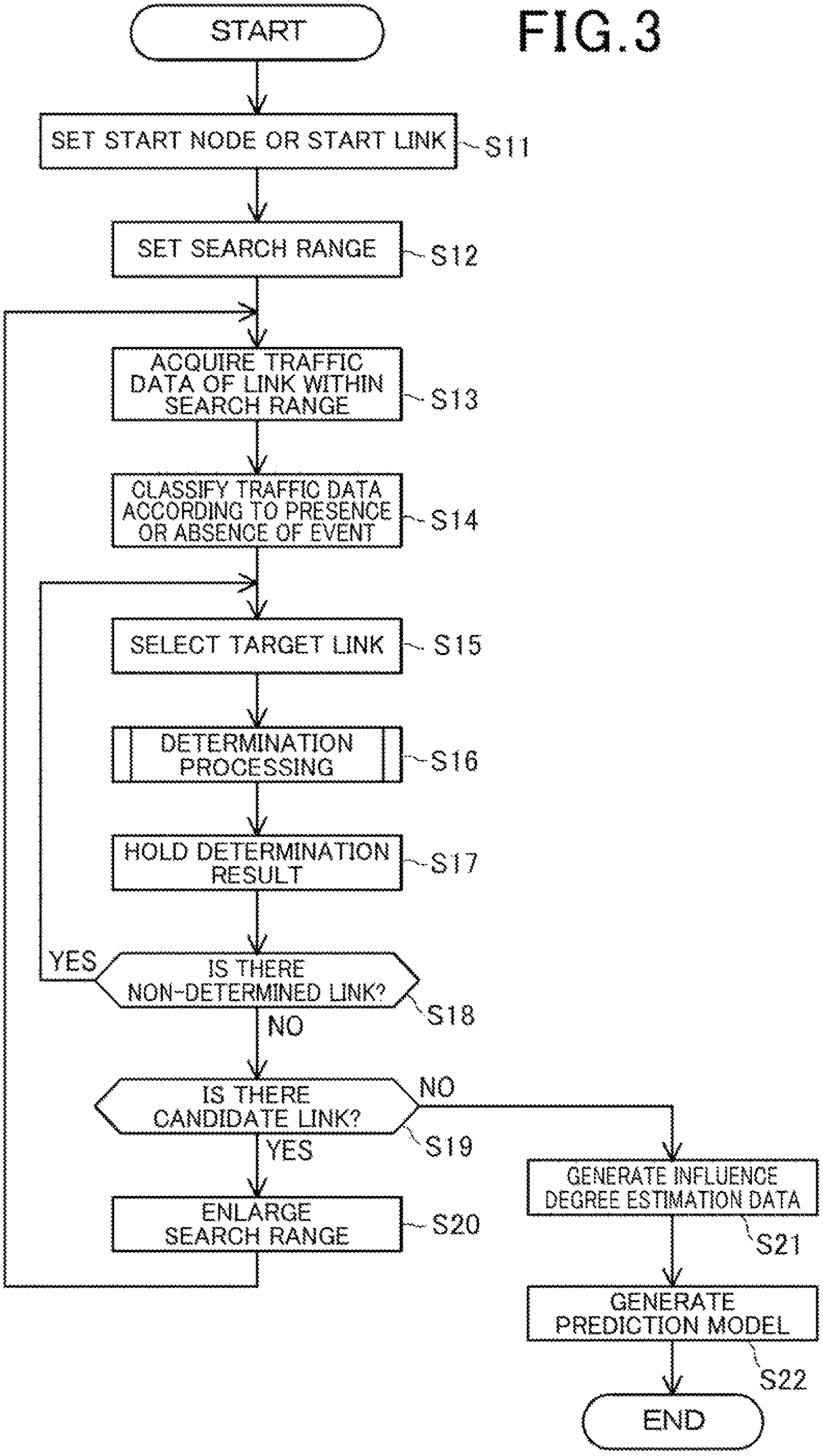
FIG. 3 is a flowchart illustrating an operation of the information processing apparatus.
Figure 4:
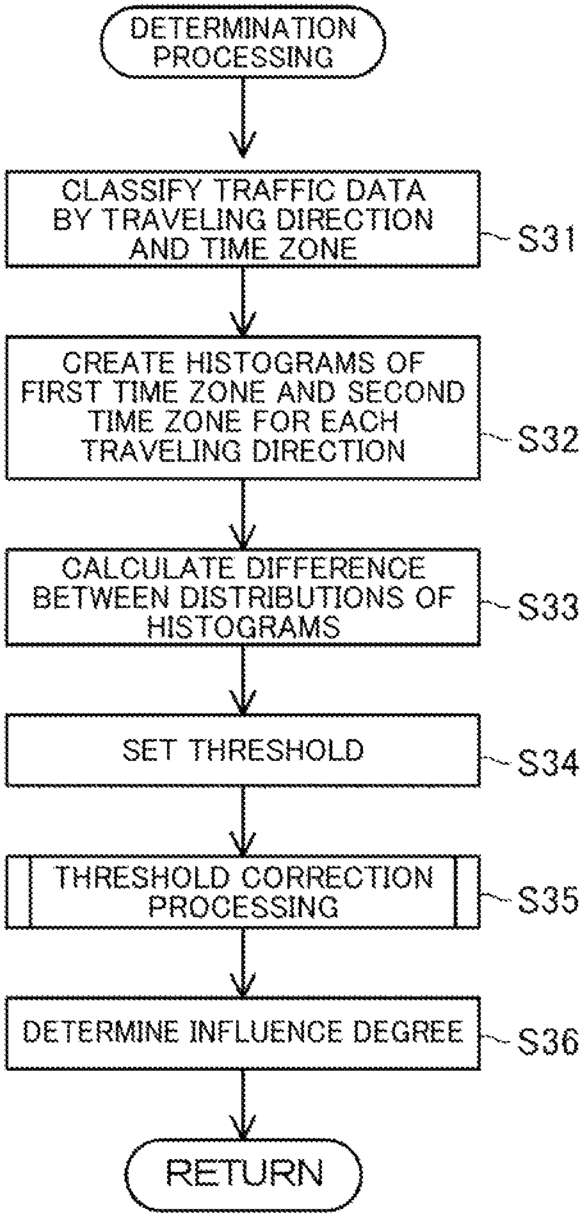
FIG. 4 is a flowchart illustrating an operation of the information processing apparatus.
Figure 5:
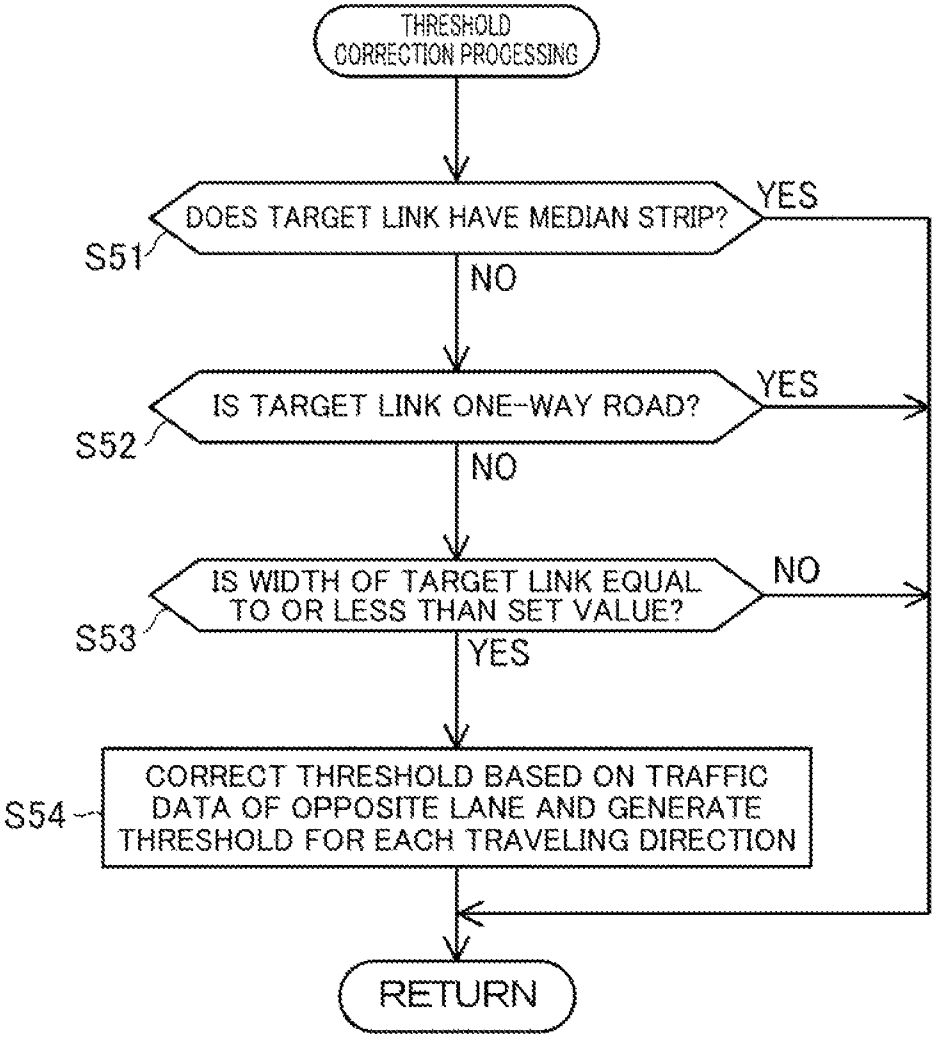
FIG. 5 is a flowchart illustrating an operation of the information processing apparatus.
Figure 6:
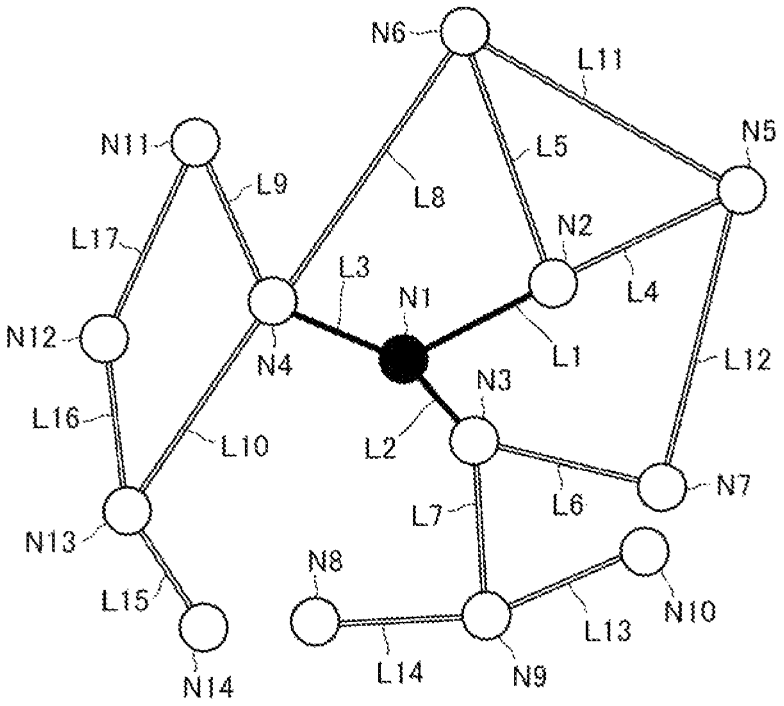
FIG. 6 is an explanatory diagram of an operation of searching for a link.
Figure 7:
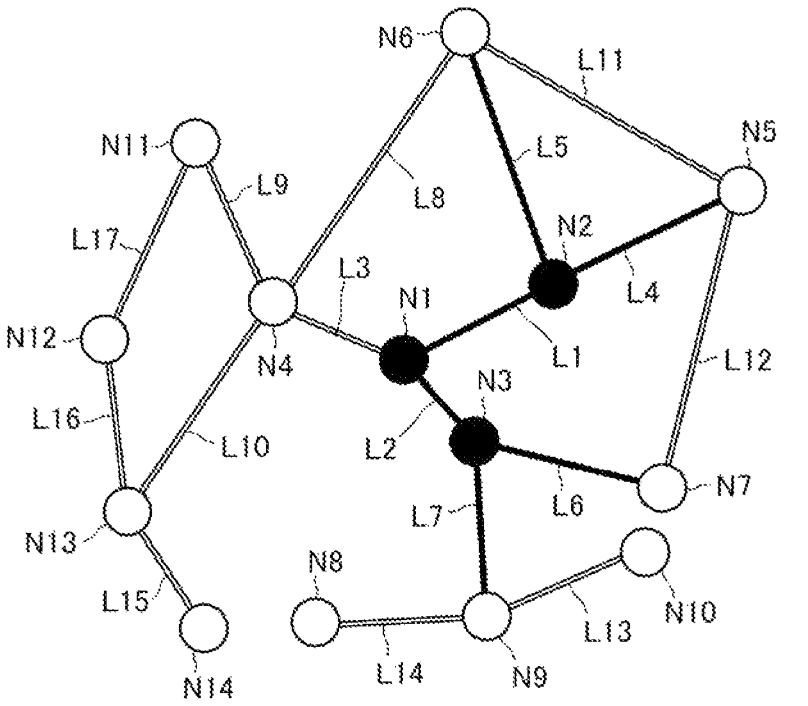
FIG. 7 is an explanatory diagram of the operation of searching for the link.
Figure 8:
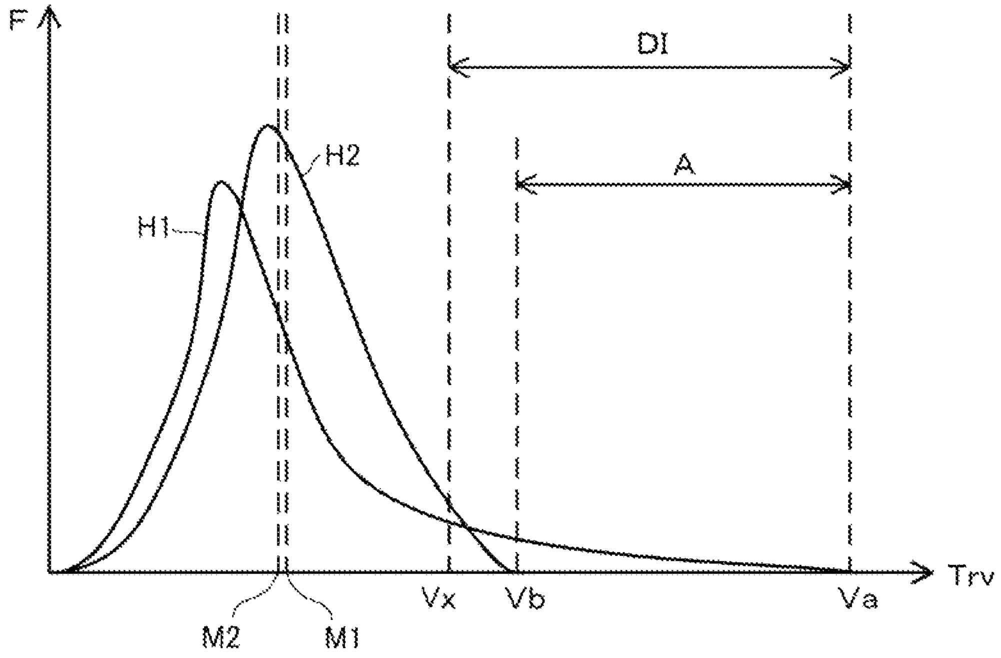
FIG. 8 is a diagram illustrating an example of a histogram created by the information processing apparatus.

FIGS. 3, 4, and 5 are flowcharts illustrating an operation of the information processing apparatus 1. FIGS. 6 and 7 are explanatory diagrams of an operation in which the information processing apparatus 1 searches for the link. FIG. 8 is a diagram illustrating an example of a histogram created by the information processing apparatus 1. Hereinafter, the operation of the information processing apparatus 1 will be described with reference to these drawings.

[2-1. Overall Sequence]

The controller 10 determines a start node or a start link related to a position where an event has occurred (step S11). Details of step S11 will be described. The controller 10 refers to the start position setting data 54 and specifies the type of the facility associated with the type of the event. The controller 10 sets the start node or the start link based on the facility at the position where the event has occurred (referred to as the "event occurrence facility") and/or a facility associated with the position where the event has occurred, the facility being of a type designated by the start position setting data 54 (referred to as the "related type facility"). The facility associated with the occurrence position of the event may be the facility closest to the position where the event has occurred or the facility within a predetermined range from the position where the event has occurred.

When the controller 10 sets the start node as a processing start position, the controller 10 sets, as the start node, the event occurrence facility, the node closest to the event occurrence facility, or the node associated with the facility among the nodes included in the road data 51. Alternatively or additionally, when the controller 10 sets the start node as the processing start position, the controller 10 sets, as the start node, the node closest to the related type facility or the node associated with the facility among the nodes included in the road data 51. Here, examples of the "node associated with the facility" include an intersection to which a name or an abbreviation of the facility is assigned and an intersection connected to a road link adjacent to the facility. When the start link is set, the controller 10 sets, as the start link, the road link adjacent to the event occurrence facility or the road link associated with the facility among the links included in the road data 51. Alternatively or additionally, when the controller 10 sets the start link as the processing start position, the controller 10 sets, as the start link, the road link adjacent to the related type facility or the road link associated with the facility among the links included in the road data 51. Here, examples of the "link associated with the facility" include the link connected to an entrance or an exit of the facility or another facility provided side by side with the facility and the road link having a name or an abbreviation of the facility. These are collectively referred to as links close to the event occurrence facility.

The controller 10 sets a search range centered on the start node or the start link (step S12). In step S12, the controller 10 sets, for example, a range, including the link connected to the start node, the link close to the start node, or the start link, as the search range. As a result, the link related to the occurrence position of the event is set as a target link.

The controller 10 acquires the traffic data 53 regarding the link within the search range (step S13). The controller 10 classifies the traffic data 53 acquired in step S13 into data obtained when the event has occurred and data obtained when no event occurs (step S14). In step S14, the controller 10 classifies the data by a date and time, for example. Specifically, the controller 10 classifies the traffic data into the traffic data 53 including a date and time or a time zone when the event has occurred or in a time zone close to the date and time when the event has occurred and the traffic data 53 in other time zones.

The controller 10 selects one link to be determined from the links within the search range and sets the selected link as the target link (step S15).

The controller 10 executes determination processing (step S16). The determination processing is a processing for determining a degree of influence of the event on the traffic condition of the target link. For example, by the determination processing, it is determined whether or not the traffic condition of the target link is affected by the occurrence of the event. Alternatively, the controller 10 calculates an index of the degree of influence of the event on the traffic condition of the target link by the determination processing. The determination processing will be described later with reference to FIG. 4.

The controller 10 temporarily holds the result of the determination processing in association with the target link (step S17). For example, the controller 10 stores the result of the determination processing and an information indicating the determined link in the memory 21 in association with each other.

The controller 10 determines the presence or absence of the link for which the determination processing has not been performed among the links within the search range (step S18). When there is the link for which the determination processing has not been performed (step S18; YES), the controller 10 returns to step S15 and selects the next target link (step S15).

When there is no link for which the determination processing has not been performed (step S18; NO), the controller 10 determines whether or not there is a candidate link for determination outside the search range based on the determination result held in step S17 (step S19). Specifically, the candidate link is the link having a high degree of influence of the event or the link adjacent to the link determined to be affected by the event, and is the link outside the search range. The determination in step S19 is made based on the determination result held in step S17. When there is the candidate link (step S19; YES), the controller 10 changes (enlarges) the search range so that the candidate link is included (step S20), and returns to step S13. When there are a plurality of links determined to have a high degree of influence of the event, and when there are a plurality of links adjacent to the link determined to have a high degree of influence of the even, the search range is changed (enlarged) to include all of these links.

The change (enlargement) of the search range will be described with reference to FIGS. 6 and 7. In the following description, the change (enlargement) of the search range is simply referred to as enlargement.

FIG. 6 illustrates a state in which the search range is set in a range including nodes N1 to N14 and links L1 to L17. The example of FIG. 6 is an example in which the controller 10 sets the node N1 as the start node. In this example, the controller 10 sets the links L1, L2, and L3 connected to the node N1 as the search range.

The controller 10 executes the determination processing on the links L1, L2, and L3. When it is determined that the link L1 is affected by the event, the link adjacent to the link L1 is the candidate link. In the example of FIG. 6, the links adjacent to the link L1 are the links L4 and L5 connected to the node N2 which is an end point of the link L1.

In this embodiment, an example is illustrated in which it is determined that the links L1 and L2 are affected by the event and it is determined that the link L3 is not affected by the event. That is, the links L4 and L5 adjacent to the link L1 and the links L6 and L7 adjacent to the link L2 are the candidate links, and the links L8, L9, and L10 which are the links adjacent to the link L3 are not the candidate links. The controller 10 enlarges the search range based on these determination results.

FIG. 7 illustrates a state after the search range is enlarged from the state illustrated in FIG. 6.

In FIG. 7, the search range is enlarged to include the links L4, L5, L6, and L7. Thereafter, the controller 10 performs determination on the links L4, L5, L6, and L7 newly included in the search range due to the enlargement of the search range.

Returning to FIG. 3, when there is no candidate link (step S19; NO), the controller 10 generates influence degree estimation data based on the determination result held in step S17 (step S21). The influence degree estimation data includes data indicating the link affected by the traffic condition due to the occurrence of the event. The influence degree estimation data may include information such as the node in contact with the link affected by the traffic condition due to the occurrence of the event, a time zone when the traffic condition of the link is affected, and the type of the event. The controller 10 generates a prediction model based on the influence degree estimation data (step S22), and ends the operation. A learning model of artificial intelligence (AI) executes machine learning in which the influence degree estimation data is used as learning data, whereby the prediction model is obtained. Using the prediction model, it is possible to evaluate the influence on the traffic condition when the virtual event occurs. Step S22 is a step of causing the learning model to execute learning, and may be executed after the influence degree estimation data is accumulated. For example, the controller 10 may accumulate and store the influence degree estimation data, generated in step S21, in the traffic database 50. In this case, a processing for causing the machine learning model to learn the influence degree estimation data may be executed by an apparatus different from the information processing apparatus 1. The learning data may be newly generated by arranging and aggregating data items of the influence degree estimation data by the controller 10 or the traffic database 50. The learning executed by the learning model may be supervised learning, and it is of course possible to adopt other learning methods. The prediction model learned may be caused to execute further learning using the newly generated influence degree estimation data.

In the above operation, steps S12 to S15 correspond to an example of a first link setting step. Step S16 corresponds to an example of a determining step, and step S19 corresponds to an example of a second link setting step.

[2-2. Determination Processing]

FIG. 4 illustrates the determination processing illustrated in step S16 of FIG. 3 in detail.

The controller 10 classifies the traffic data 53 of the target link by the traveling direction and the time zone (step S31). For example, when the target link is a road extending in a north and south direction, the controller 10 classifies the traffic data 53 into southward data and northward data.

The controller 10 further classifies the traffic data 53 for each time zone. For example, the controller 10 classifies the traffic data 53 into data in a first time zone and data in a second time zone. The first time zone is a time zone when the link to be determined is estimated to be affected by the event. For example, the first time zone is a time zone including the date and time when the event has occurred or a time zone when the event has occurred. Furthermore, the first time zone may be a time zone close to the date and time when the event has occurred or the time zone when the event has occurred. When the target link is far away from a place where the event has occurred, it is estimated that a time difference between the date and time of occurrence of the event and a timing at which the influence reaches the target link is large. In such a case, the controller 10 may set the first time zone to a time zone not including the date and time of occurrence of the event and the time zone when the event has occurred. The second time zone is a time zone more distant from both the date and time of occurrence of the event and the time zone when the event has occurred with respect to the first time zone. The second time zone is a time zone when it is estimated that the target link is not affected by the event.

The controller 10 creates histograms of the first time zone and the second time zone for each traveling direction (step S32). In step S32, the controller 10 classifies the travel times for the target link into classes in a predetermined time unit, and creates a histogram with the classes on the horizontal axis and a frequency on the vertical axis.

Specifically, in step S32, the controller 10 creates a first histogram based on the traffic data 53 in the first time zone for one traveling direction. Furthermore, for this traveling direction, the controller 10 creates a second histogram based on the traffic data 53 in the second time zone.

FIG. 8 is an example of the histogram created by the controller 10, and illustrates two histograms created by the controller 10 for one traveling direction of one target link. A histogram H1 corresponds to the first histogram, and a histogram H2 corresponds to the second histogram. For convenience of understanding, FIG. 8 illustrates approximate curves, indicating frequency distribution of the traffic data 53, as the histograms H1 and H2.

In the example of FIG. 8, a difference in histograms occurs due to the influence of the event.

The histogram H1 has a wider base than the histogram H2 and includes a large amount of data in the class away from the median value. For example, when a maximum value of the data included in the histogram H1 of FIG. 8 is Va and a maximum value of the data included in the histogram H2 is Vb, the histogram H1 includes a large number of data between Va and Vb. Since data having a high class value indicates that the travel time for the link is long, the histogram H1 in FIG. 8 indicates that traffic congestion or congestion has occurred in traffic of the target link due to the influence of the event.

In the drawing, an average value of the histogram H1 is represented as M1, and an average value of the histogram H2 is represented as M2. Since the average values M1 and M2 are strongly affected by the data having a high frequency among the data of the histograms H1 and H2, it is difficult to reflect a difference in the class having a low frequency. Also in the example of FIG. 8, a difference between the average value M1 and the average value M2 is clearly smaller than a difference between the class value Va and the class value Vb. As described above, when the average value is used as an index indicating the difference between the histograms, the difference between the histogram H1 and the histogram H2 is evaluated to be small, so that it is difficult to accurately determine the influence of the event.

Returning to FIG. 4, the controller 10 calculates a difference between distributions of the first histogram for the first time zone and the second histogram for the second time zone (step S33). For example, the controller 10 obtains a distance index between the first histogram and the second histogram as an index indicating the difference between the distributions of the histograms.

As the distance index, for example, a KL divergence shown in the following formula (1) can be used. A JS divergence shown in the following formula (2) may be used. In the following formulas (1), (2), and (3), Xn is a vector representing data of the first histogram, Xe is a vector representing data of the second histogram, and Xn and Xe are the vectors of the same size. i is an index of the class.

[Math. 1]

$$D_{KL}(X_n \| X_e) = \sum_i X_n(i) \log \frac{X_n(i)}{X_e(i)} \quad (1)$$

$$D_{JS} = \frac{D_{KL}(X_n \| X_e) + D_{KL}(X_e \| X_n)}{2} \quad (2)$$

As a more preferable distance index, a distance index D shown in the following formula (3) may be used. In the distance index D, a difference of the class having a small frequency between the first histogram and the second histogram is emphasized and reflected. Therefore, by using the distance index D of the following formula (3), a difference between the first histogram and the second histogram can be obtained by reflecting the influence of the data having a small frequency. In the following formula (3), a radical sign of a vector means a vector obtained by applying the radical sign to an element of each vector. T is a symbol representing transposition of a vector.

[Math. 2]

$$D = \|\sqrt{X_n} - \sqrt{X_e}\|^2 = 2 - 2\sqrt{X_n}^T \sqrt{X_e} \quad (3)$$

Similarly, as a preferable distance index, an estimation amount of p may be obtained by the following formula (5) for p obtained by the following formula (4), and may be used as the distance index. In the following formula (4), P(a) is a symbol representing a probability of being a.

[Math. 3]

$$p = P(X_e > X_n) + \frac{1}{2} P(X_e = X_n) \quad (4)$$

-continued $$\hat{p} = \frac{\overline{R}_e - \overline{R}_n}{N} + \frac{1}{2} \quad (5)$$

(N is a sum of the number of elements of $X_n$ and $X_e$, and $\overline{R}_e$ and $\overline{R}_n$ are averages of orders)

In addition, as an index indicating the difference between the first histogram and the second histogram, an index indicating a spread of the base of the histogram may be used. As this index, a difference A between a B percentile value of the second histogram and a maximum value of data included in the first histogram is calculated, and this difference can be used as the index. B is arbitrarily set from a natural number. In the example of FIG. 8, the difference A between a 90 percentile value Vx of the histogram H2 and the maximum value Va of the data included in the histogram H1 can be used as an index.

When the target link is a road having a plurality of traveling directions, the controller 10 calculates the difference between the distributions of the histograms for each traveling direction in step S33.

The controller 10 sets a threshold for determining the difference between the distributions of the histograms (step S34). The threshold is a preset value and is stored in the memory 21 or the traffic database 50.

The controller 10 executes a threshold correction processing for correcting the threshold in accordance with a scale of a road that is the target link (step S35). Details of the threshold correction processing will be described later.

The controller 10 determines the degree of influence of the event on the target link by comparing the difference between the distributions calculated in step S33 with the threshold (step S36).

In step S36, for example, the controller 10 determines that the target link is affected by the event when the value of the difference between the distributions calculated in step S33 is equal to or greater than the threshold, and determines that the target link is not affected by the event when the value of the difference between the distributions is less than the threshold. When the target link is the road having the plurality of traveling directions, the controller 10 compares the difference between the distributions of the histograms for each traveling direction with the threshold in step S36. As a result, the controller 10 determines the degree of influence of the event for each traveling direction. In addition, the controller 10 adds the determination results in the respective traveling directions together, and the added results are taken as the determination result of the target link.

For example, when it is determined that there is the influence of the event in any traveling direction of the target link, it is determined that the target link is affected by the event. When it is determined that there is no influence of the event in all the traveling directions, it is determined that the target link is not affected by the event. After obtaining the determination result in step S36, the controller 10 proceeds to step S17.

In the processing of FIG. 4, the controller 10 determines the degree of influence of the event on the traffic condition of the target link for each traveling direction in the target link. The controller 10 may perform the above operation when the target link is a large-scale road, and may combine the traffic data 53 for each traveling direction of the target link when the target link is not the large-scale road. In this case, for the target link, a histogram is created without limiting the traveling direction, that is, without classifying the traveling direction, and the degree of influence of the event is determined for the traffic condition in which all the traveling directions are combined.

As described above, the controller 10 determines the degree of influence of the event on the traffic condition of the target link for each moving direction in the target link when the target link is a large-scale road, and determines the degree of influence of the event on the traffic condition of the target link without classifying the moving direction in the target link when the target link is not the large-scale road.

When the scale of the road is small, traveling in one direction is easily affected by traveling in the other direction. Therefore, for a small-scale road, it may be preferable to determine the degree of influence of the event without distinguishing the traveling direction.

When the scale of the road is small, since the vehicle traffic volume is not large, the number of data of the traffic data 53 tends to be small. When the degree of influence of the event on such a road is determined, if an average value of the travel time or the like is used as in the conventional method, the accuracy of the determination may decrease due to a small amount of data. For example, in JP 2016-110360 A, although congestion is predicted using an average degree of congestion on weekdays and the average degree of congestion on holidays in an area to be predicted, since an average of data is used, the accuracy decreases when the number of data is insufficient or when an outlier is included in the data.

On the other hand, in the present embodiment, by obtaining the difference between the distributions of the histograms of the target link, the determination can be performed with high accuracy as compared with the case of using an average of the data regarding the traffic condition. In addition, by combining the traffic data 53 for each traveling direction for a road whose scale is not large, the number of apparent data of data used for creating a histogram can be increased, and determination accuracy can be further improved.

[2-3. Threshold Correction Processing]

FIG. 5 illustrates the threshold correction processing illustrated in step S35 of FIG. 4 in detail.

The controller 10 corrects the threshold when the target link is not a large-scale road. The large-scale road is a road satisfying that the road has a median strip and/or that the width exceeds a set value. The controller 10 selects in steps S51 to S53 whether or not the target link is a large-scale road. In the following description, as an example of a road that is not a large-scale road, a road that does not have a median strip and has a width equal to or less than the set value is referred to as a "small-scale road".

The controller 10 determines whether or not the target link is a road having a median strip (step S51). If the target link is the road having a median strip (step S51; YES), the controller 10 proceeds to step S36.

If the target link is not the road having a median strip (step S51; NO), the controller 10 determines whether or not the target link is a one-way road (step S52). If the target link is the one-way road (step S52; YES), the controller 10 proceeds to step S36.

When the target link is not the one-way road (step S52; NO), the controller 10 determines whether or not the width of the target link is equal to or less than the set value (step S52). When the width is larger than the set value (step S53; NO), the controller 10 proceeds to step S36.

When the width of the target link is equal to or less than the set value (step S53; YES), the controller 10 corrects the threshold (step S54), and proceeds to step S36.

In step S54, the controller 10 corrects the threshold set in step S34 (FIG. 4) to generate a different threshold for each traveling direction.

As described above, since the number of data of the traffic data 53 is small on the road with a small width, it is difficult to perform determination with high accuracy. In the present embodiment, the accuracy of the determination is enhanced by correcting the threshold using the traffic data of an opposite lane.

Here, the traveling directions of the target link are a first direction and a second direction opposite to the first direction. The controller 10 calculates a characteristic amount $T_{R1}$ of the base of the histogram of the target link in the first direction and a characteristic amount $T_{R2}$ of the base of the histogram in the second direction.

The characteristic amounts $T_{R1}$ and $T_{R2}$ of the base of the histogram are indices indicating the difference between the first histogram and the second histogram in the class with a small number of data (frequency). For example, the difference A between the B percentile value of the second histogram and the maximum value of the data included in the first histogram, or a value obtained from the difference A can be taken as the characteristic amounts $T_{R1}$ and $T_{R2}$. B is arbitrarily set from a natural number.

The controller 10 acquires a threshold $T_{R1,\ base}$ of the target link in the first direction and a threshold $T_{R2,\ base}$ in the second direction. The thresholds $T_{R1,\ base}$ and $T_{R2,\ base}$ are basic thresholds in the first direction and the second direction, and are set in step S34. The thresholds $T_{R1,\ base}$ and $T_{R2,\ base}$ may be the same value.

The controller 10 calculates the threshold of the target link in the first direction by the following formula (6) and calculates the threshold in the second direction by the following formula (7).

$$Thr_{R1}=T_{R1,base}+\alpha T_{R2} \tag{6}$$

$$Thr_{R2}=T_{R2,base}+\alpha T_{R1} \tag{7}$$

Here, α is a predetermined constant.

As described above, in the threshold correction processing, when the target link is not a large-scale road, the threshold in the case of determining the degree of influence of the event on the traffic condition in the first direction of the target link is corrected based on the traffic condition in the second direction of the target link. When the target link is a large-scale road, the processing for correcting the threshold in the case of determining the degree of influence of the event on the traffic condition in the first direction of the target link based on the traffic condition in the second direction is not performed. As a result, the traffic condition of the opposite lane can be reflected in the determination processing of the degree of influence of the event on the small-scale road. In a road having a narrow width and capable of traveling in both directions, it is conceivable that due to the influence of traffic congestion or congestion in one traveling direction, traffic congestion or congestion occurs also in the other traveling direction. Thus, by reflecting the traffic condition of the opposite lane, traffic congestion due to the influence of the event or whether the traffic congestion has occurred can be determined with high accuracy.

3. Other Embodiments

The above embodiment illustrates a specific example to which the present invention is applied, and does not limit a mode to which the present invention is applied.

In the threshold correction processing illustrated in FIG. 5, the example is illustrated in which the threshold is corrected for a small-scale road; however, the threshold may be corrected for the target link that is not the small-scale road.

For example, in step S34, the controller 10 may correct the threshold, stored in the memory 21 or the traffic database 50, based on an element related to the target link. Examples of the element related to the target link include a geographical relationship between the target link and the start node or the event occurrence facility, consistency of the traffic condition between the target link and an adjacent link, and a time zone when an influence of the traffic condition is evaluated. The geographical relationship between the target link and the start node or the event occurrence facility is, for example, a distance from the start node or the event occurrence facility to the target link. The consistency of the traffic condition is whether or not the difference between the distributions of the histograms in the target link and the difference between the distributions of the histograms in the link adjacent to the target link show the same tendency. The time zone when the influence of the traffic condition is evaluated is whether or not a time difference between the first time zone and the second time zone related to the creation of the histogram and the date and time of occurrence of the event is equal to or greater than a threshold. The accuracy of the determination can be improved by correcting the threshold based on at least one of these elements. For example, it is possible to expect effects such as eliminating traffic congestion that has occurred by causes unrelated to the event or the influence of the traffic congestion, and suppressing an influence of variations in occurrence state of traffic congestion between links.

For example, in step S34, the controller 10 may correct the threshold, stored in the memory 21 or the traffic database 50, based on the histogram of the target link. In this case, the controller 10 may correct the threshold according to a difference in the spread of the bases of the first histogram and the second histogram. For example, when the difference A is equal to or more than a set value, the controller 10 loosely corrects the threshold to make it easy to determine that there is the influence of the event, and when the difference A is less than the set value, the controller 10 strictly corrects the threshold to make it difficult to determine that there is the influence of the event. In this case, a change in the class having a small number of data in the histogram can be strongly reflected in the determination result, and the degree of influence of the event can be determined more accurately.

In the above embodiment, an example has been described in which the controller 10 performs determination in step S16 and determines the presence or absence of the candidate link based on the determination result. In this example, the determination of the degree of influence of the event on the target link and the determination of whether or not to enlarge the search range are substantially performed using the same reference.

When the controller 10 determines the presence or absence of the candidate link in step S19, the controller 10 may perform the determination based on a criterion different from that of the determination processing in step S16. That is, in the determining step, the determination may be performed using a plurality of thresholds.

For example, after the controller 10 determines the target link in step S36, the controller 10 may perform the second determination for specifying the presence or absence of the candidate link using a different threshold. In the second determination, a threshold more lenient than the determination in step S36 may be used. Specifically, the threshold for the second determination is determined such that the link adjacent to the target link is determined to be the candidate link for the target link determined not to be affected by the event in step S36. In this case, after the determination in step S36, the controller 10 may set the threshold for the second determination for each traveling direction. In this case, in the processing for enlarging the search range, the links that may be affected by the event can be included in the search range without omission, and the degree of influence of the event can be determined more accurately.

4. Configuration Supported by Above-Described Embodiment

The above-described embodiment is a specific example of the following configuration.

(Item 1) An information processing method of determining an influence of an event on a traffic condition, the method including: a first link setting step of setting a link, related to an occurrence position of the event, as a target link; a determining step of determining a degree of influence of the event on the traffic condition of the target link; and a second link setting step of setting a link adjacent to the target link as a new target link based on a determination result of the determining step, in which the processing in the determining step is performed on the target link specified in the second link setting step.

According to the information processing method of item 1, a target of determination is expanded by setting the new target link based on the result of determining the degree of influence of the event on the traffic condition of the target link, so that a processing for determining the influence of the event on the traffic condition can be efficiently performed.

(Item 2) The information processing method described in item 1, in which in the determining step, when it is determined that the degree of influence of the event on the traffic condition of the target link is low, the second link setting step is not executed.

According to the information processing method of item 2, since a link having a low possibility of being affected by the event is not to be determined, the processing for determining the influence of the event on the traffic condition can be performed more efficiently.

(Item 3) The information processing method described in item 1 or 2, in which in the determining step, the degree of influence of the event on the traffic condition of the target link is determined for each moving direction in the target link.

According to the information processing method of item 3, the influence of the event on the traffic condition can be determined with higher accuracy.

(Item 4) The information processing method described in item 3, in which in the determining step, when the target link is a large-scale road, the degree of influence of the event on the traffic condition of the target link is determined for each moving direction in the target link.

According to the information processing method of item 4, it is possible to determine the influence of the event on the traffic condition with higher accuracy in consideration of the possibility that there is little data regarding the traffic condition on a road whose scale is not large.

(Item 5) The information processing method described in any one of items 1 to 4, in which in the determining step, a first histogram indicating a distribution of a travel time for the target link in a first time zone and a second histogram indicating a distribution of the travel time for the target link in a second time zone farther from an occurrence time of the event with respect to the first time zone are created, and the degree of influence of the event on the traffic condition of the target link is determined based on a difference between the distributions of the first histogram and the second histogram.

According to the information processing method of item 5, a plurality of histograms are created for each time zone, and the determination is performed using the difference between the distributions of the histograms. As a result, it is possible to suppress the influence of the outlier of the data and the influence of the small amount of data, and determine the influence of the event on the traffic condition with higher accuracy.

(Item 6) The information processing method described in item 5, in which in the determining step, a distance index between the first histogram and the second histogram is calculated, and the presence or absence of the degree of influence of the event on the traffic condition of the target link is determined by comparing the distance index with a threshold.

According to the information processing method of item 6, it is possible to accurately evaluate the difference between the histograms appearing in the target link by using the distance indices of the plurality of histograms. As a result, the influence of the event on the traffic condition can be determined with higher accuracy.

(Item 7) The information processing method described in item 6, in which in the determining step, the threshold is corrected based on a difference in distribution spread between the first histogram and the second histogram, and the determination is performed using the corrected threshold.

According to the information processing method of item 7, the influence of the event on the traffic condition can be determined with higher accuracy by correcting the threshold based on the difference in spread of the plurality of histograms.

(Item 8) The information processing method described in item 6 or 7, in which in the determining step, when the target link is a road allowing passage in a first direction and a second direction opposite to the first direction, the threshold in a case where the degree of influence of the event on the traffic condition of the target link in the first direction is determined is corrected based on the traffic condition of the target link in the second direction.

According to the information processing method of item 8, it is possible to evaluate and determine the traffic condition in the target link in consideration of the traffic condition in the opposing direction. As a result, the influence of the event on the traffic condition can be determined with higher accuracy.

(Item 9) The information processing method described in item 8, in which in the determining step, when the target link is not a large-scale road, the threshold in the case where the degree of influence of the event on the traffic condition of the target link in the first direction is determined is corrected based on the traffic condition of the target link in the second direction.

According to the information processing method of item 9, when the target link is a small-scale road, the traffic condition in the target link is evaluated in consideration of the traffic condition in the opposing direction. As a result, the influence of the event on the traffic condition can be determined with higher accuracy.

(Item 10) The information processing method described in any one of items 1 to 9, in which in the first link setting step, among facilities associated with the occurrence position, a link close to the facility of the type associated with the type of the event is set as the target link.

According to the information processing method of item 10, the target link serving as a start point of search can be suitably set according to the type of the event. As a result, the influence of the event on the traffic condition can be determined with higher accuracy.

(Item 11) An information processing apparatus that determines an influence of an event on a traffic condition, the information processing apparatus setting a link, related to an occurrence position of the event, as a target link, executing a determination processing of determining a degree of influence of the event on the traffic condition of the target link, setting a link adjacent to the target link as a new target link based on a result of the determination processing, and performing the determination processing on the target link specified.

According to the information processing apparatus of item 11, since the target of determination is expanded by setting a new target link on the basis of the result of determining the degree of influence of the event on the traffic condition of the target link, the process of determining the influence of the event on the traffic condition can be efficiently performed.

REFERENCE SIGNS LIST

1 information processing apparatus
10 controller
11 processor
12 information acquisition unit
13 processing unit
21 memory
31 communication unit
32 input unit
33 output unit
50 traffic database
51 road data
52 facility data
53 traffic data
54 start position setting data
55 prediction data

What is claimed is:

1. An information processing method of determining an influence of an event on a traffic condition, the method comprising:

a first link setting step of setting a link, related to a facility associated with an occurrence position of the event, as a target link;

a determining step of determining a degree of influence of the event on the traffic condition of the target link; and a second link setting step of setting a link adjacent to the target link as a new target link based on a determination result of the determining step, wherein the processing in the determining step is performed on the target link specified in the second link setting step, the determination result of the determining step is stored in a memory in association with information indicating the target link, the method further comprising:

a step of generating influence degree estimation data, in which an influence of occurrence of a predetermined event on a traffic situation is associated with a time period in which the event has occurred and a type of the event, based on the determination result and the information indicating the target link stored in the memory;

a step of determining an influence on a traffic situation when a virtual event occurs using a prediction model obtained by performing machine leaning in which the influence degree estimation data is used as learning data; and a step of displaying a video indicating the determined influence of the virtual event on the traffic situation.

2. The information processing method according to claim 1, wherein in the determining step, when it is determined that the degree of influence of the event on the traffic condition of the target link is low, the second link setting step is not executed.

3. The information processing method according to claim 1, wherein in the determining step, the degree of influence of the event on the traffic condition of the target link is determined for each moving direction in the target link.

4. The information processing method according to claim 3, wherein in the determining step, when the target link is a large-scale road which has a median strip or a width that exceeds a set value, the degree of influence of the event on the traffic condition of the target link is determined for each moving direction in the target link.

5. The information processing method according to claim 1, wherein in the determining step, a first histogram indicating a distribution of a travel time for the target link in a first time zone and a second histogram indicating a distribution of the travel time for the target link in a second time zone farther from an occurrence time of the event with respect to the first time zone are created, and the degree of influence of the event on the traffic condition of the target link is determined based on a difference between the distributions of the first histogram and the second histogram.

6. The information processing method according to claim 5, wherein in the determining step, a distance index between the first histogram and the second histogram is calculated, and the presence or absence of the degree of influence of the event on the traffic condition of the target link is determined by comparing the distance index with a threshold.

7. The information processing method according to claim 6, wherein in the determining step, the threshold is corrected based on a difference in distribution spread between the first histogram and the second histogram, and the determination is performed using the corrected threshold.

8. The information processing method according to claim 6, wherein in the determining step, when the target link is a road allowing passage in a first direction and a second direction opposite to the first direction, the threshold in a case where the degree of influence of the event on the traffic condition of the target link in the first direction is determined is corrected based on the traffic condition of the target link in the second direction.

9. The information processing method according to claim 8, wherein in the determining step, when the target link is not a large-scale road which has a median strip or which has a width that exceeds a set value, the threshold in the case where the degree of influence of the event on the traffic condition of the target link in the first direction is determined is corrected based on the traffic condition of the target link in the second direction.

10. The information processing method according to claim 1, wherein in the first link setting step, among facilities associated with the occurrence position, a link close to the facility of the type associated with the type of the event is set as the target link.

11. An information processing apparatus that determines an influence of an event on a traffic condition based on road data regarding a node and a link, the information processing apparatus comprising a processor, wherein the processor sets a first link, related to a facility associated with an occurrence position of the event, as a target link, executes a determination processing of determining a degree of influence of the event on the traffic condition of the target link, sets a link adjacent to the target link as a new target link based on a result of the determination processing, performs the determination processing on the target link specified, stores the determination result of the determination processing in a memory in association with information indicating the target link, based on the determination result and the information indicating the target link stored in the memory, generates influence degree estimation data in which an influence of occurrence of a predetermined event on a traffic situation is associated with a time period in which the event has occurred and a type of the event, determines an influence on a traffic situation when a virtual event occurs using a prediction model obtained by performing machine learning in which the influence degree estimation data is used as learning data, and displays a video indicating the determined influence of the virtual event on the traffic situation.

* * * * *